(12) United States Patent
Aoyagi

(10) Patent No.: US 8,478,270 B2
(45) Date of Patent: Jul. 2, 2013

(54) MOBILE COMMUNICATION METHOD AND MOBILE STATION FOR AUTOMATICALLY REGISTERING THE MOBILE STATION IN A FEMTOCELL

(75) Inventor: Kenichiro Aoyagi, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 88 days.

(21) Appl. No.: 13/122,286

(22) PCT Filed: Oct. 2, 2009

(86) PCT No.: PCT/JP2009/067220
§ 371 (c)(1),
(2), (4) Date: Jun. 10, 2011

(87) PCT Pub. No.: WO2010/038855
PCT Pub. Date: Apr. 8, 2010

(65) Prior Publication Data
US 2011/0312325 A1    Dec. 22, 2011

(30) Foreign Application Priority Data
Oct. 2, 2008    (JP) .................................. 2008-257814

(51) Int. Cl.
*H04W 60/00* (2009.01)
(52) U.S. Cl.
USPC ..................................................... 455/435.2
(58) Field of Classification Search
USPC ............................................ 455/435.2, 450
See application file for complete search history.

(56) References Cited

U.S. PATENT DOCUMENTS
2011/0312325 A1* 12/2011 Aoyagi ...................... 455/435.2

FOREIGN PATENT DOCUMENTS
| JP | 11 32371 | 2/1999 |
| JP | 2001 8271 | 1/2001 |
| JP | 2005 142682 | 6/2005 |
| JP | 2005 286869 | 10/2005 |
| JP | 2006 333304 | 12/2006 |

OTHER PUBLICATIONS

International Search Report issued Dec. 22, 2009 in PCT/JP09/067220 filed Oct. 2, 2009, Oct. 17, 2012.

* cited by examiner

*Primary Examiner* — William D Cumming
(74) *Attorney, Agent, or Firm* — Oblon, Spivak, McClelland, Maier & Neustadt, L.L.P.

(57) ABSTRACT

A femtocell base station transmits broadcast information to a mobile station, the broadcast information including a permitted state mode and identification information corresponding to the femtocell. The mobile station shifts a state mode to a permitted state mode when the state mode of the mobile station and the permitted state mode included in the broadcast information differ. The mobile station then transmits a registration request for the femtocell when the identification information corresponding to the femtocell included in the broadcast information is not included in an access permission list managed by the mobile station. The mobile station then camps on the femtocell when the registration succeeds.

2 Claims, 3 Drawing Sheets

MOBILE COMMUNICATION METHOD AND MOBILE STATION FOR AUTOMATICALLY REGISTERING THE MOBILE STATION IN A FEMTOCELL

TECHNICAL FIELD

The present invention relates to a mobile communication method and a mobile station.

BACKGROUND ART

In recent years, it has been encouraged to set a state mode of a mobile station to a "manner mode" in a library, a train, or the like, and also encouraged to set the state mode of the mobile station to a "drive mode" while driving a car.

In addition, studies have been made on introduction of a "femtocell radio base station" which is installed by a user and which permits only registered mobile stations to access a femtocell.

SUMMARY OF INVENTION

Technical Problem

However, there are actually cases where the state mode of the mobile station is not set to the "manner mode" even in a library, a train or the like and where the state mode of the mobile station is not set to the "drive mode" even while driving a car, because the user has forgotten to set the mode, or the setting is troublesome.

In addition, for permission of access to a femtocell under the femtocell radio base station, each of mobile stations is required to be registered for the femtocell. However, there is a problem that the registration processing is time-consuming and troublesome.

Hence, the present invention has been made in view of the aforementioned problem, and an objective thereof is to provide a mobile communication method and a mobile station which are capable of automatically performing a registration procedure of the mobile station in a femtocell for the femtocell while automatically shifting a state mode of the mobile station to a desired state mode.

Means for Solving the Problem

The first feature of the present invention is summarized as a mobile communication method comprising the steps of: transmitting broadcast information from a femtocell radio base station to a mobile station in a femtocell, the broadcast information including a permitted state mode and identification information on the femtocell; shifting a state mode of the mobile station to the permitted state mode by the mobile station when the state mode of the mobile station and the permitted state mode included in the broadcast information are different from each other; transmitting a registration request for the femtocell from the mobile station when the identification information on the femtocell included in the broadcast information is not included in an access permission list managed by the mobile station; and camping on the femtocell by the mobile station when the registration of the mobile station for the femtocell succeeds.

A second feature of the present invention is summarized as a mobile station comprising: an access permission list management unit configured to manage an access permission list including identification information on a femtocell where an access is permitted; a broadcast information reception unit configured to receive, from a femtocell under a femtocell radio base station, broadcast information including a permitted state mode and the identification information on the femtocell; a mode switching unit configured to shift a state mode of the mobile station to the permitted state mode included in the broadcast information when the state mode of the mobile station and the permitted state mode are different from each other; a registration unit configured to transmit a registration request for the femtocell when the identification information on the femtocell included in the broadcast information is not included in the access permission list; and a camp on processing unit configured to camp on the femtocell when the registration of the mobile station for the femtocell succeeds.

Advantageous Effects of Invention

As described above, the present invention can provide a mobile communication method and a mobile station which are capable of automatically performing a registration procedure for a femtocell of the mobile station in the femtocell while automatically shifting a state mode of the mobile station to a desired state mode.

DESCRIPTION OF EMBODIMENT (Configuration of Mobile Communication System According to First Embodiment of Present Invention)

Figure 1:
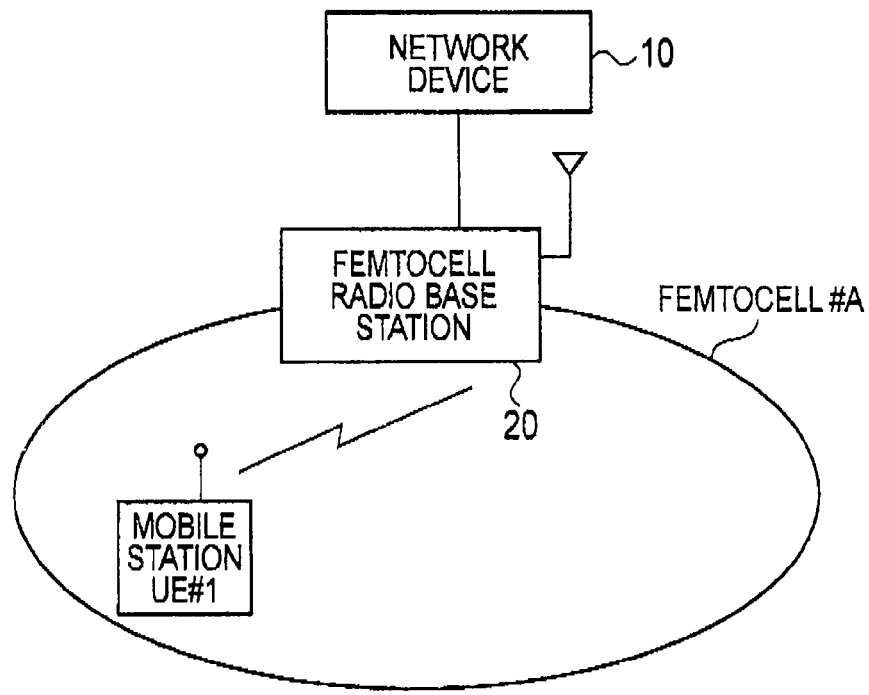
FIG. 1 is an overall configuration diagram of a mobile communication system according to a first embodiment of the present invention.
Figure 2:
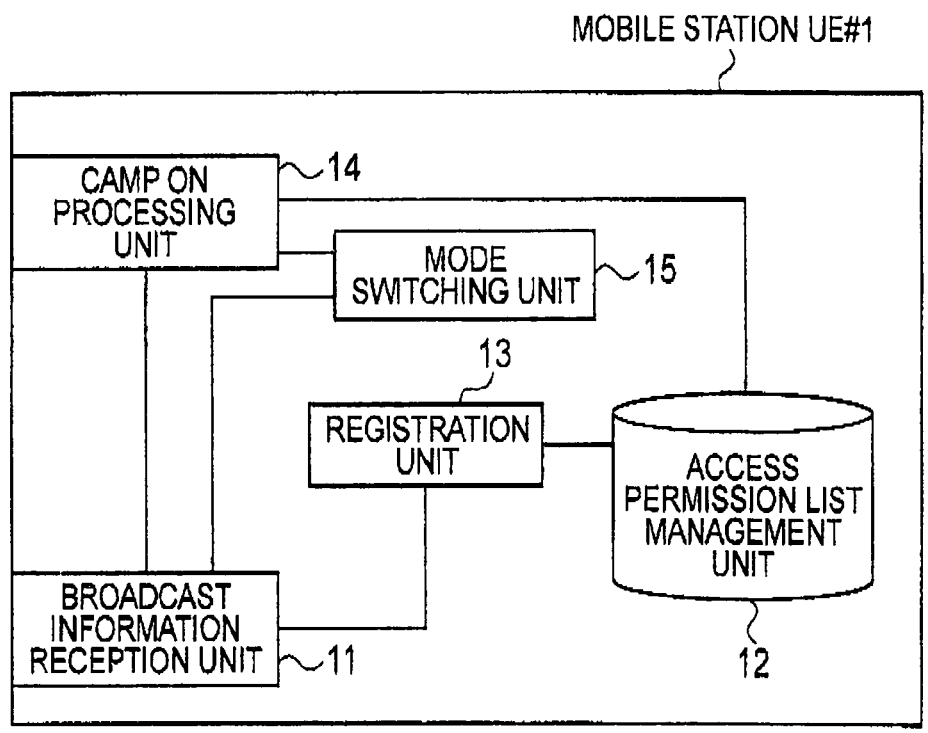
FIG. 2 is a functional block diagram of a mobile station according to the first embodiment of the present invention.
Figure 3:
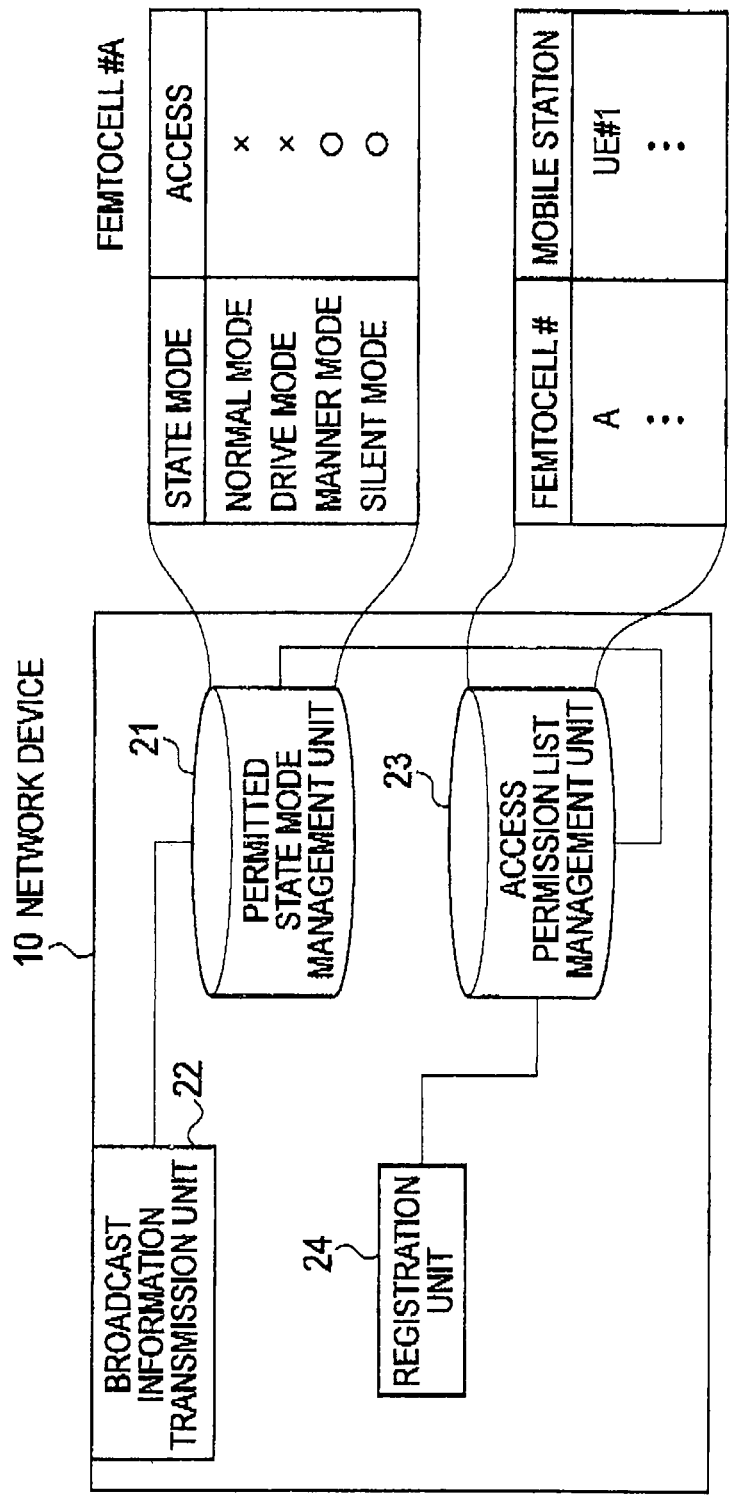
FIG. 3 is a functional block diagram of a network device according to the first embodiment of the present invention.

A description is given of a mobile communication system according to a first embodiment of the present invention with reference to FIG. 1 to FIG. 3.

As shown in FIG. 1, the mobile communication system according to the first embodiment of the present invention includes a network device 10 and a femtocell radio base station 20 configured to manage a femtocell #A. In an example in FIG. 1, a mobile station UE#1 camps on the femtocell #A.

As shown in FIG. 2, the mobile station UE#1 includes a broadcast information reception unit 11, an access permission list management unit 12, a registration unit 13, a camp on processing unit 14, and a mode switching unit 15.

The broadcast information reception unit 11 is configured to receive, from the femtocell #A under the femtocell radio base station 20, broadcast information including a permitted state mode and identification information on the femtocell #A.

Note that the mobile station UE#1 can access the femtocell #A only when the state mode of the mobile station UE#1 is set to the permitted state mode. For example, a manner mode, a drive mode, a silent mode, a normal mode, and the like are conceivable as the state mode of the mobile station UE#1. The network device 10 designates any one of these state modes as the permitted state mode.

The access permission list management unit 12 is configured to manage an access permission list including identification information on femtocells where an access of the mobile station UE#1 is permitted.

The mode switching unit 15 is configured to shift a state mode of the mobile station UE#1 to the permitted state mode when the state mode of the mobile station UE#1 and the permitted state mode included in the broadcast information are different from each other.

The registration unit 13 is configured to transmit a registration request for the femtocell #A when identification information on the femtocell #A included in the broadcast information is not included in the access permission list.

The camp on processing unit 14 is configured to camp on the femtocell #A when the registration of the mobile station UE#1 for the femtocell #A succeeds.

As shown in FIG. 3, the network device 10 includes a permitted state mode management unit 21, a broadcast information transmission unit 22, an access permission list management unit 23, and a registration unit 24.

It should be noted that when the mobile communication system according to the first embodiment of the present invention is a mobile communication system employing a WCDMA method, the network device 10 is a radio network controller RNC or an exchange MSC/SGSN. In addition, when the mobile communication system according to the first embodiment of the present invention is a mobile communication system employing an LTE (Long Term Evolution) method, the network device 10 is an exchange MME.

The permitted state mode management unit 21 is configured to manage the permitted state mode of femtocells. For example, in FIG. 3, the permitted state mode management unit 21 is configured to manage the manner mode and the silent mode as the permitted state mode in the femtocell #A.

The network device 10 may be configured such that an operation and service person of the network device 10 changes the permitted state mode by operating buttons provided with the network device 10 or by performing predetermined operations based on display on a display screen of the network device 10.

The broadcast information transmission unit 22 is configured to transmit broadcast information including the permitted state mode in each of the femtocells and identification information on the femtocell to the mobile station UE#1 in the femtocell (for example, the femtocell #A).

The access permission list management unit 23 is configured to manage the access permission list including identification information on mobile stations access by which is permitted in the femtocell. In the example in FIG. 3, the access permission list managed by the access permission list management unit 23 includes identification information on the mobile station UE#A as identification information on one of the mobile stations access by which is permitted in the femtocell #A.

The registration unit 24 is configured to judge whether or not to permit a registration procedure of a specific mobile station with a specific femtocell on the basis of a predetermined rule, upon receipt of a request for registration of the specific mobile station with the specific femtocell.

Note that the registration unit 24 is configured to store the specific femtocell and the specific mobile station in association with each other in the access permission list managed by the access permission list management unit 23 when the registration processing is judged to be permitted.

(Operation of Mobile Communication System According to First Embodiment of Present Invention)

Hereinbelow, a description is given of an operation of the mobile station UE#1 according to the first embodiment of the present invention with reference to FIG. 4.

Figure 4:
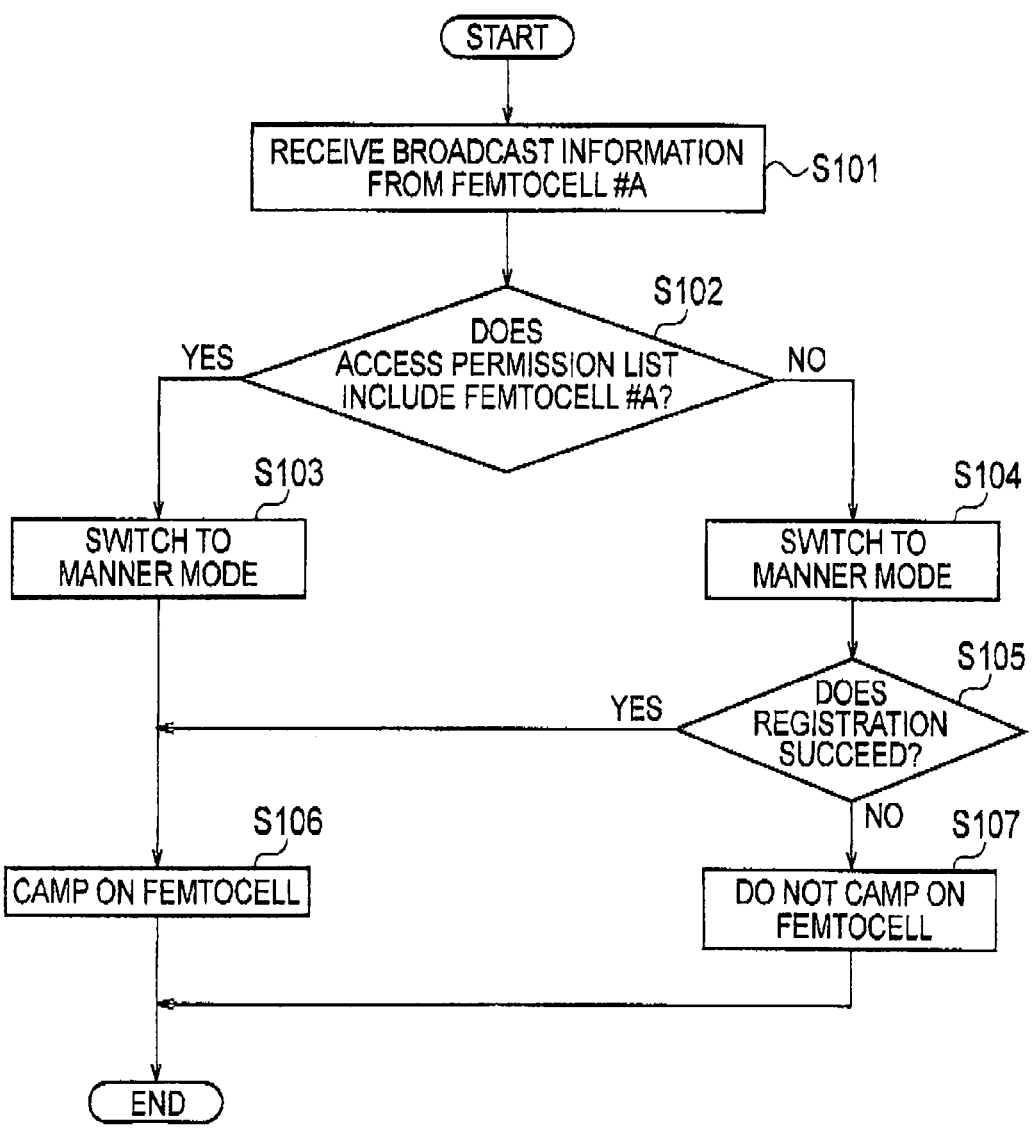
FIG. 4 is a flowchart showing an operation of the mobile station according to the first embodiment of the present invention.

As shown in FIG. 4, the mobile station UE#1 receives broadcast information from the femtocell #A in Step S101.

In Step S102, the mobile station UE#1 judges whether or not identification information on the femtocell #A included in the received broadcast information is included in the access permission list managed by the mobile station UE#1.

If it is judged that the identification information on the femtocell #A is included therein, the operation proceeds to Step S103. If it is judged that the identification information on the femtocell #A is not included, the operation proceeds to Step S104.

In Steps S103 and S104, the mobile station UE#1 shifts the state mode of the mobile station UE#1 to the permitted state mode (for example, the manner mode) included in the received broadcast information.

In Step S105, the mobile station UE#1 transmits a registration request for the femtocell #A to the network device 10. If the registration procedure with femtocell #A succeeds, the operation proceeds to Step S106. If the registration procedure with femtocell #A fails, the operation proceeds to Step S107.

In Step S106, the mobile station UE#1 starts to camp on the femtocell #A.

On the other hand, in Step S107, the mobile station UE#1 starts to camp on a cell other than the femtocell #A.

(Advantageous Effects of Mobile Communication System According to First Embodiment of Present Invention)

The mobile communication system according to the first embodiment of the present invention makes it possible to automatically perform the registration procedure for the femtocell #A of the mobile station UE#1 in the femtocell #A while automatically shifting the state mode of the mobile station UE#1 to a desired state mode (for example, the manner mode, the silent mode or the like).

(Modification)

The aforementioned embodiment has been described by taking as an example the mobile communication system employing the W-CDMA method. However, the present invention is not limited to the mobile communication system and applicable to a mobile communication system employing the LTE (Long Term Evolution) method, for example.

In addition, the aforementioned functions of the network device 10 may be implemented in the femtocell radio base station 20.

Note that the aforementioned operations of the mobile station UE#1, the femtocell radio base station 20, and the network device 10 may be implemented by means of hardware, a software module executed by a processor, or a combination of both.

The software module may be provided in any type of storage medium such as an RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the mobile station UE#1, the femtocell radio base station 20, and the network device 10. Also, the storage medium and the processor may be provided in the mobile station UE#1, the femtocell radio base station 20, and the network device 10 as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

The invention claimed is:

1. A mobile communication method comprising the steps of:

transmitting broadcast information from a femtocell radio base station to a mobile station in a femtocell, the broadcast information including a permitted state mode and identification information on the femtocell;

shifting a state mode of the mobile station to the permitted state mode by the mobile station when the state mode of the mobile station and the permitted state mode included in the broadcast information are different from each other;

transmitting a registration request for the femtocell from the mobile station when the identification information on the femtocell included in the broadcast information is not included in an access permission list managed by the mobile station; and camping on the femtocell by the mobile station when the registration of the mobile station for the femtocell succeeds.

2. A mobile station comprising:

an access permission list management unit configured to manage an access permission list including identification information on a femtocell where an access is permitted;

a broadcast information reception unit configured to receive, from a femtocell under a femtocell radio base station, broadcast information including a permitted state mode and the identification information on the femtocell;

a mode switching unit configured to shift a state mode of the mobile station to the permitted state mode included in the broadcast information when the state mode of the mobile station and the permitted state mode are different from each other;

a registration unit configured to transmit a registration request for the femtocell when the identification information on the femtocell included in the broadcast information is not included in the access permission list; and a camp on processing unit configured to camp on the femtocell when the registration of the mobile station for the femtocell succeeds.

* * * * *